(12) United States Patent
Rich et al.

(10) Patent No.: US 11,235,748 B2
(45) Date of Patent: Feb. 1, 2022

(54) USE OF ADJUSTABLE BATTERY SYSTEM WITHIN A VEHICLE WITH AN HV BATTERY OR FUEL CELL SYSTEM

(71) Applicant: GM Global Technology Operations LLC, Detroit, MI (US)

(72) Inventors: Dave G. Rich, Sterling Heights, MI (US); Lyall K. Winger, Waterloo (CA); Saad Hasan, Detroit, MI (US); Gary W. Gantt, Jr., Chesterfield Township, MI (US); Mahmoud Abd Elhamid, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 182 days.

(21) Appl. No.: 16/290,570

(22) Filed: Mar. 1, 2019

(65) Prior Publication Data
US 2020/0276966 A1    Sep. 3, 2020

(51) Int. Cl.
| | |
|---|---|
| *B60W 20/10* | (2016.01) |
| *H02J 7/16* | (2006.01) |
| *H02J 7/34* | (2006.01) |
| *H02J 7/14* | (2006.01) |
| *B60L 58/10* | (2019.01) |
| *H02J 7/00* | (2006.01) |

(52) U.S. Cl.
CPC ............ *B60W 20/10* (2013.01); *B60L 58/10* (2019.02); *H02J 7/0024* (2013.01); *H02J 7/143* (2020.01); *H02J 7/1423* (2013.01); *H02J 7/1438* (2013.01); *H02J 7/16* (2013.01); *H02J 7/34* (2013.01); *B60L 2240/547* (2013.01); *Y02T 10/70* (2013.01)

(58) Field of Classification Search
CPC ... B60W 20/10; B60L 2240/547; B60L 58/10; H02J 7/16; H02J 7/34; H02J 7/143; H02J 7/1423; H02J 7/0024; H02J 7/0026; H02J 7/1438; Y02T 10/70
USPC ........... 307/28, 43, 44, 80, 20, 19, 5, 4, 9.1; 320/119, 134
See application file for complete search history.

(56) References Cited

U.S. PATENT DOCUMENTS

| | | | |
|---|---|---|---|
| 6,909,201 | B2 | 6/2005 | Murty et al. |
| 9,184,582 | B2 | 11/2015 | Koch et al. |

(Continued)

FOREIGN PATENT DOCUMENTS

WO    WO-2018/174864 A1    9/2018

OTHER PUBLICATIONS

U.S. Appl. No. 16/013,254, filed Jun. 20, 2018, Rich et al.

(Continued)

*Primary Examiner* — Arnold M Kinkead

(57) ABSTRACT

A battery control system includes first and second batteries each including first and second terminals configured to output a first voltage, third and fourth terminals configured to output a second voltage, a plurality of individually housed batteries, and a plurality of switches configured to connect ones of the individually housed batteries to and from ones of the first, second, third, and fourth terminals. A control module is configured to selectively provide the first voltage from either one of the first battery and the second battery to a first set of loads and selectively provide the second voltage from either one of the first battery and the second battery to a second set of loads.

15 Claims, 11 Drawing Sheets

(56) References Cited

U.S. PATENT DOCUMENTS

| | | |
|---|---|---|
| 9,440,600 B2 | 9/2016 | Koch et al. |
| 9,911,249 B2 | 3/2018 | Koch et al. |
| 2002/0167291 A1 | 11/2002 | Imai et al. |
| 2005/0093512 A1 | 5/2005 | Mader et al. |
| 2005/0212495 A1 | 9/2005 | Leyten et al. |
| 2008/0118828 A1 | 5/2008 | Brennfoerder |
| 2009/0139781 A1* | 6/2009 | Straubel ............ B60L 50/64 180/65.1 |
| 2013/0200848 A1 | 8/2013 | Ozawa et al. |
| 2014/0077592 A1 | 3/2014 | Koch et al. |
| 2014/0183939 A1 | 7/2014 | Jiang et al. |
| 2014/0225443 A1 | 8/2014 | Nomoto |
| 2015/0251542 A1 | 9/2015 | Mensah-Brown et al. |
| 2016/0318411 A1* | 11/2016 | Goetz ................. B60L 58/20 |
| 2017/0205467 A1* | 7/2017 | Kiuchi ............. H01M 10/482 |
| 2018/0217206 A1 | 8/2018 | Kiuchi |
| 2019/0043276 A1 | 2/2019 | Conell et al. |
| 2019/0348664 A1 | 11/2019 | Kim |

OTHER PUBLICATIONS

U.S. Appl. No. 16/034,782, filed Jul. 13, 2018, Conell et al.
U.S. Appl. No. 16/053,073, filed Aug. 2, 2018, Conell et al.
U.S. Appl. No. 16/183,803, filed Nov. 8, 2018, Winget et al.
U.S. Appl. No. 16/183,895, filed Nov. 8, 2018, Rich et al.
U.S. Appl. No. 16/184,126, filed Nov. 8, 2018, Winger et al.
U.S. Appl. No. 16/275,809, filed Feb. 14, 2019, Winger et al.
U.S. Appl. No. 16/290,457, filed Mar. 1, 2019, Winger et al.
U.S. Appl. No. 16/275,809, filed Feb. 14, 2019, Lyall K. Winger et al.
U.S. Appl. No. 16/183,803, filed Nov. 8, 2018, Lyall K. Winger et al.

* cited by examiner

USE OF ADJUSTABLE BATTERY SYSTEM WITHIN A VEHICLE WITH AN HV BATTERY OR FUEL CELL SYSTEM

CROSS-REFERENCE TO RELATED APPLICATIONS

The present disclosure is related by subject matter to U.S. patent application Ser. No. 16/183,803, filed on Nov. 8, 2018. The entire disclosure of the application referenced above is incorporated herein by reference.

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against the present disclosure.

The present disclosure relates to vehicles and more particularly to battery systems of vehicles.

Some types of vehicles include only an internal combustion engine that generates propulsion torque. Pure electric vehicles include a battery system and an electric motor. Hybrid vehicles include both an internal combustion engine and one or more electric motors. Some types of hybrid vehicles utilize the electric motor and the internal combustion engine in an effort to achieve greater fuel efficiency than if only the internal combustion engine was used. Some types of hybrid vehicles utilize the electric motor and the internal combustion engine to achieve greater torque output than the internal combustion could achieve by itself.

Some example types of hybrid vehicles include parallel hybrid vehicles, series hybrid vehicles, and other types of hybrid vehicles. In a parallel hybrid vehicle, the electric motor works in parallel with the engine to combine power and range advantages of the engine with efficiency and regenerative braking advantages of electric motors. In a series hybrid vehicle, the engine drives a generator to produce electricity for the electric motor, and the electric motor drives a transmission. This allows the electric motor to assume some of the power responsibilities of the engine, which may permit the use of a smaller and possibly more efficient engine.

SUMMARY

A battery control system includes first and second batteries each including first and second terminals configured to output a first voltage, third and fourth terminals configured to output a second voltage, a plurality of individually housed batteries, and a plurality of switches configured to connect ones of the individually housed batteries to and from ones of the first, second, third, and fourth terminals. A control module is configured to selectively provide the first voltage from either one of the first battery and the second battery to a first set of loads and selectively provide the second voltage from either one of the first battery and the second battery to a second set of loads.

In other features, the second voltage is different from the first voltage.

In other features, the first voltage is one of 12 volts, 24 volts, 36 volts, and 48 volts.

In other features, the control module includes a first switching device configured to receive and selectively output the first voltage from the first battery and a second switching device configured to receive and selectively output the first voltage from the second battery.

In other features, the control module includes a third switching device configured to receive and selectively output the second voltage from the first battery and a fourth switching device configured to receive and selectively output the second voltage from the second battery.

In other features, the control module includes a fifth switching device configured to receive the first voltage from either one of the first switching device and the second switching device and supply the first voltage to the first set of loads.

In other features, the control module includes a sixth switching device configured to receive the second voltage from either one of the third switching device and the fourth switching device and supply the second voltage to the second set of loads.

A battery control system includes a battery including first and second terminals configured to output a first voltage, third and fourth terminals configured to output a second voltage, a plurality of individually housed batteries, and a plurality of switches configured to connect ones of the individually housed batteries to and from ones of the first, second, third, and fourth terminals. An output control module is configured to detect either one of the first voltage and the second voltage and connect selected ones of the individually housed batteries to a corresponding one of the first and second terminals and the third and fourth terminals.

In other features, to adjust the detected one of the first voltage and the second voltage, the output control module is configured to selectively connect one or more of the individually housed batteries to increase the detected one of the first voltage and the second voltage based on a difference between a desired output voltage and the detected one of the first voltage and the second voltage.

In other features, the output control module includes an output voltage detection module configured to detect the first voltage and the second voltage.

In other features, to adjust the detected one of the first voltage and the second voltage, the output control module is configured to selectively disconnect one or more of the individually housed batteries to decrease the detected one of the first voltage and the second voltage based on a difference between a desired output voltage and the detected one of the first voltage and the second voltage.

In other features, to adjust the detected one of the first voltage and the second voltage, the output control module is configured to sequentially connect two more of the individually housed batteries to incrementally increase the detected one of the first voltage and the second voltage based on a difference between a desired output voltage and the detected one of the first voltage and the second voltage.

A battery control system includes a battery including first and second terminals configured to output a first voltage, third and fourth terminals configured to output a second voltage, a plurality of individually housed batteries, and a plurality of switches configured to connect ones of the individually housed batteries to and from ones of the first, second, third, and fourth terminals. A charging module is configured to detect a charging voltage provided from an external charger to the first and second terminals or the third and fourth terminals and connect selected ones of the individually housed batteries to a corresponding one of the first and second terminals and the third and fourth terminals in accordance with the detected charging voltage to charge the selected ones of the individually housed batteries.

In other features, the charging module is configured to connect one of the individually housed batteries to the corresponding one of the first and second terminals and the third and fourth terminals in response to detecting that the charging voltage corresponds to the first voltage and connect two or more of the individually housed batteries to the corresponding one of the first and second terminals and the third and fourth terminals in response to detecting that the charging voltage corresponds to the second voltage.

In other features, the charging module is configured to sequentially connect ones of the individually housed batteries to the corresponding one of the first and second terminals and the third and fourth terminals.

In other features, the charging module is configured to disconnect the connected one of the individually housed batteries from the corresponding one of the first and second terminals and the third and fourth terminals in response to a determination that charging of the connected one of the individually housed batteries is complete.

In other features, the charging module is configured to sequentially connect sets of two or more of the individually housed batteries to the corresponding one of the first and second terminals and the third and fourth terminals.

In other features, the charging module is configured to connect one of the individually housed batteries to the corresponding one of the first and second terminals and the third and fourth terminals when the charging voltage corresponds to 12 volts and connect two or more of the individually housed batteries to the corresponding one of the first and second terminals and the third and fourth terminals when the charging voltage corresponds to more than 12 volts.

In other features, the battery control system further includes a second battery and the charging module is configured to selectively supply the charging voltage from the external charger to one of the battery and the second battery.

In other features, the charging module is configured to selectively supply the charging voltage from the external charger to the one of the battery and the second battery based on a predetermined charging sequence.

Further areas of applicability of the present disclosure will become apparent from the detailed description, the claims and the drawings. The detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

In the drawings, reference numbers may be reused to identify similar and/or identical elements.

DETAILED DESCRIPTION

A vehicle includes a battery having multiple sets of output terminals for outputting respective voltages. For example, the battery includes one or more first sets of output terminals on a housing of the battery for outputting a first operating voltage (e.g., 12 V or 48 V) and one or more sets of second output terminals on the housing for outputting a second operating voltage (e.g., 48 V or 12V). The battery includes a plurality of individually housed battery modules. One or more of the battery modules may correspond to a dynamically adjustable battery system including a plurality of batteries and a plurality of switches. A switch control module controls the switches to connect individual ones of the batteries of the adjustable battery system to different output terminals and to provide target capacities and output voltages at the output terminals. The switch control module may set the target capacities, for example, based on a mode of operation of the vehicle (e.g., cranking, auxiliary, run, etc.).

The battery may include a high voltage (HV) stack of battery modules (e.g., configured to provide a voltage greater than or equal to 60 V) and a low voltage (LV) stack of battery modules isolated from the HV stack. Each stack may include one or more adjustable battery systems according to the present disclosure. In one example, an LV control module selectively provides voltages from respective adjustable battery systems of an HV stack to multiple low voltage (e.g., 12 V or 48 V) loads.

In some examples, one or more of the adjustable battery systems may be configured to provide a charging interface between an external charger and the batteries of the adjustable battery systems. For example, a charging module (e.g., the LV control module or another controller internal to or external to the adjustable battery system) may be configured to function as a charging interface between an external charger and the adjustable battery systems. In these examples, the LV control module may detect a charging voltage received from the external charger and selectively apply the charging voltage to individual batteries of the adjustable battery systems. In other examples, the charging module may be configured to selectively adjust a rate of charge of batteries in the adjustable battery systems relative to standard (i.e., non-adjustable battery system) battery modules.

In another example, the adjustable battery systems are configured to maintain a desired output profile (e.g., a flat profile) of a high voltage output. For example, the adjustable battery systems may provide one or more adjustable voltages that are increased to maintain a flat high voltage output as states of charge of various battery modules in the battery decrease.

Figure 1:
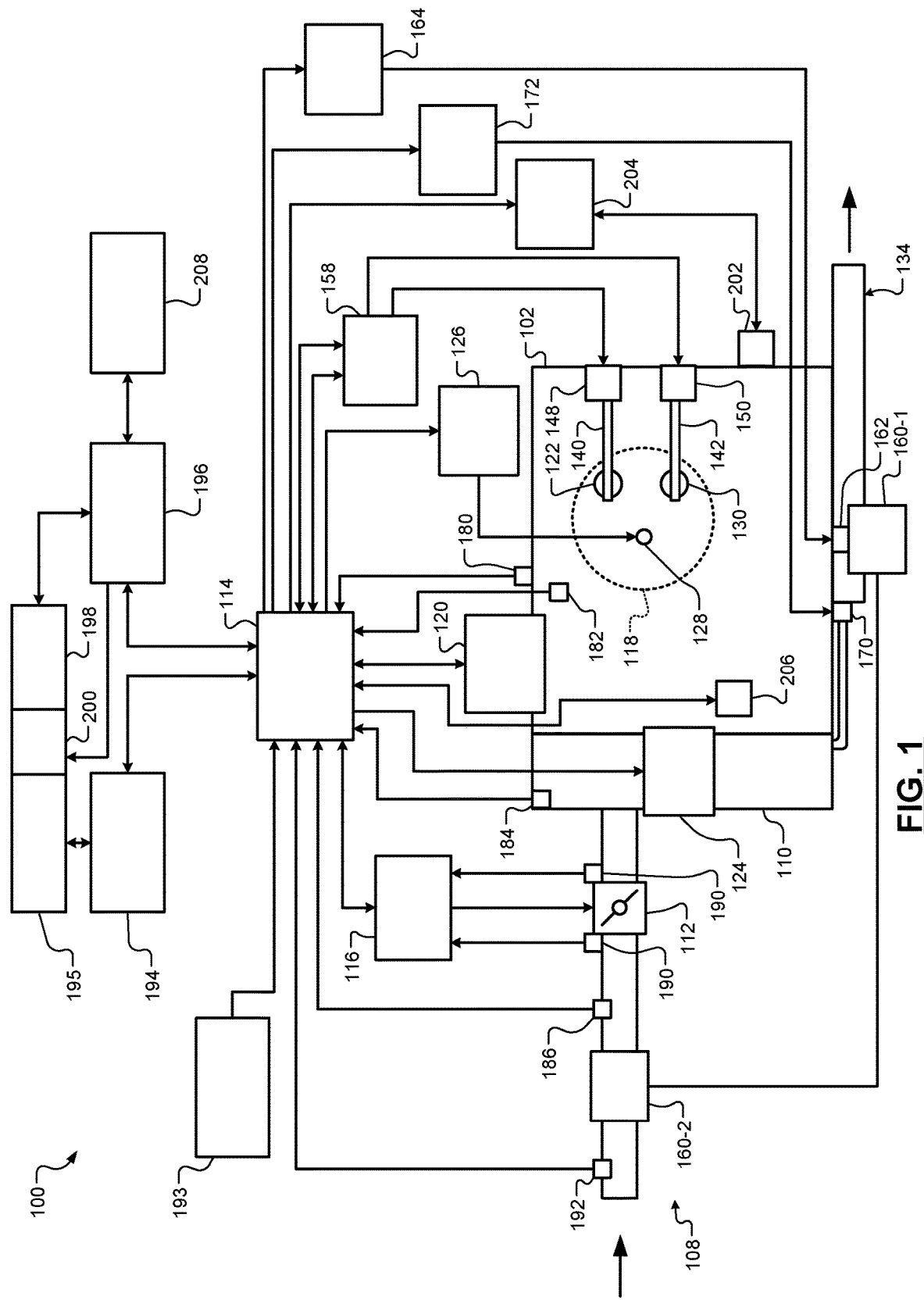
FIG. 1 is a functional block diagram of an example engine control system.

Referring now to FIG. 1, a functional block diagram of an example powertrain system 100 is presented. The powertrain system 100 of a vehicle includes an engine 102 that combusts an air/fuel mixture to produce torque. The vehicle may be non-autonomous or autonomous.

Air is drawn into the engine 102 through an intake system 108. The intake system 108 may include an intake manifold 110 and a throttle valve 112. For example only, the throttle valve 112 may include a butterfly valve having a rotatable blade. An engine control module (ECM) 114 controls a throttle actuator module 116, and the throttle actuator module 116 regulates opening of the throttle valve 112 to control airflow into the intake manifold 110.

Air from the intake manifold 110 is drawn into cylinders of the engine 102. While the engine 102 includes multiple cylinders, for illustration purposes a single representative cylinder 118 is shown. For example only, the engine 102 may include 2, 3, 4, 5, 6, 8, 10, and/or 12 cylinders. The ECM 114 may instruct a cylinder actuator module 120 to selectively deactivate some of the cylinders under some circumstances, which may improve fuel efficiency.

The engine 102 may operate using a four-stroke cycle or another suitable engine cycle. The four strokes of a four-stroke cycle, described below, will be referred to as the intake stroke, the compression stroke, the combustion stroke, and the exhaust stroke. During each revolution of a crankshaft (not shown), two of the four strokes occur within the cylinder 118. Therefore, two crankshaft revolutions are necessary for the cylinder 118 to experience all four of the strokes. For four-stroke engines, one engine cycle may correspond to two crankshaft revolutions.

When the cylinder 118 is activated, air from the intake manifold 110 is drawn into the cylinder 118 through an intake valve 122 during the intake stroke. The ECM 114 controls a fuel actuator module 124, which regulates fuel injection to achieve a desired air/fuel ratio. Fuel may be injected into the intake manifold 110 at a central location or at multiple locations, such as near the intake valve 122 of each of the cylinders. In various implementations (not shown), fuel may be injected directly into the cylinders or into mixing chambers/ports associated with the cylinders. The fuel actuator module 124 may halt injection of fuel to cylinders that are deactivated.

The injected fuel mixes with air and creates an air/fuel mixture in the cylinder 118. During the compression stroke, a piston (not shown) within the cylinder 118 compresses the air/fuel mixture. The engine 102 may be a compression-ignition engine, in which case compression causes ignition of the air/fuel mixture. Alternatively, the engine 102 may be a spark-ignition engine, in which case a spark actuator module 126 energizes a spark plug 128 in the cylinder 118 based on a signal from the ECM 114, which ignites the air/fuel mixture. Some types of engines, such as homogenous charge compression ignition (HCCI) engines may perform both compression ignition and spark ignition. The timing of the spark may be specified relative to the time when the piston is at its topmost position, which will be referred to as top dead center (TDC).

The spark actuator module 126 may be controlled by a timing signal specifying how far before or after TDC to generate the spark. Because piston position is directly related to crankshaft rotation, operation of the spark actuator module 126 may be synchronized with the position of the crankshaft. The spark actuator module 126 may disable provision of spark to deactivated cylinders or provide spark to deactivated cylinders.

During the combustion stroke, the combustion of the air/fuel mixture drives the piston down, thereby driving the crankshaft. The combustion stroke may be defined as the time between the piston reaching TDC and the time when the piston returns to a bottom most position, which will be referred to as bottom dead center (BDC).

During the exhaust stroke, the piston begins moving up from BDC and expels the byproducts of combustion through an exhaust valve 130. The byproducts of combustion are exhausted from the vehicle via an exhaust system 134.

The intake valve 122 may be controlled by an intake camshaft 140, while the exhaust valve 130 may be controlled by an exhaust camshaft 142. In various implementations, multiple intake camshafts (including the intake camshaft 140) may control multiple intake valves (including the intake valve 122) for the cylinder 118 and/or may control the intake valves (including the intake valve 122) of multiple banks of cylinders (including the cylinder 118). Similarly, multiple exhaust camshafts (including the exhaust camshaft 142) may control multiple exhaust valves for the cylinder 118 and/or may control exhaust valves (including the exhaust valve 130) for multiple banks of cylinders (including the cylinder 118). While camshaft-based valve actuation is shown and has been discussed, camless valve actuators may be implemented. While separate intake and exhaust camshafts are shown, one camshaft having lobes for both the intake and exhaust valves may be used.

The cylinder actuator module 120 may deactivate the cylinder 118 by disabling opening of the intake valve 122 and/or the exhaust valve 130. The time when the intake valve 122 is opened may be varied with respect to piston TDC by an intake cam phaser 148. The time when the exhaust valve 130 is opened may be varied with respect to piston TDC by an exhaust cam phaser 150. A phaser actuator module 158 may control the intake cam phaser 148 and the exhaust cam phaser 150 based on signals from the ECM 114. In various implementations, cam phasing may be omitted. Variable valve lift (not shown) may also be controlled by the phaser actuator module 158. In various other implementations, the intake valve 122 and/or the exhaust valve 130 may be controlled by actuators other than a camshaft, such as electromechanical actuators, electrohydraulic actuators, electromagnetic actuators, etc.

The engine 102 may include zero, one, or more than one boost device that provides pressurized air to the intake manifold 110. For example, FIG. 1 shows a turbocharger including a turbocharger turbine 160-1 that is driven by exhaust gases flowing through the exhaust system 134. A supercharger is another type of boost device.

The turbocharger also includes a turbocharger compressor 160-2 that is driven by the turbocharger turbine 160-1 and that compresses air leading into the throttle valve 112. A wastegate (WG) 162 controls exhaust flow through and bypassing the turbocharger turbine 160-1. Wastegates can also be referred to as (turbocharger) turbine bypass valves. The wastegate 162 may allow exhaust to bypass the turbocharger turbine 160-1 to reduce intake air compression provided by the turbocharger. The ECM 114 may control the turbocharger via a wastegate actuator module 164. The wastegate actuator module 164 may modulate the boost of the turbocharger by controlling an opening of the wastegate 162.

A cooler (e.g., a charge air cooler or an intercooler) may dissipate some of the heat contained in the compressed air charge, which may be generated as the air is compressed. Although shown separated for purposes of illustration, the turbocharger turbine 160-1 and the turbocharger compressor 160-2 may be mechanically linked to each other, placing intake air in close proximity to hot exhaust. The compressed air charge may absorb heat from components of the exhaust system 134.

The engine 102 may include an exhaust gas recirculation (EGR) valve 170, which selectively redirects exhaust gas back to the intake manifold 110. The EGR valve 170 may receive exhaust gas from upstream of the turbocharger turbine 160-1 in the exhaust system 134. The EGR valve 170 may be controlled by an EGR actuator module 172.

Crankshaft position may be measured using a crankshaft position sensor 180. An engine speed may be determined based on the crankshaft position measured using the crankshaft position sensor 180. A temperature of engine coolant may be measured using an engine coolant temperature (ECT) sensor 182. The ECT sensor 182 may be located within the engine 102 or at other locations where the coolant is circulated, such as a radiator (not shown).

A pressure within the intake manifold 110 may be measured using a manifold absolute pressure (MAP) sensor 184. In various implementations, engine vacuum, which is the difference between ambient air pressure and the pressure within the intake manifold 110, may be measured. A mass flow rate of air flowing into the intake manifold 110 may be measured using a mass air flow (MAF) sensor 186. In various implementations, the MAF sensor 186 may be located in a housing that also includes the throttle valve 112.

Position of the throttle valve 112 may be measured using one or more throttle position sensors (TPS) 190. A temperature of air being drawn into the engine 102 may be measured using an intake air temperature (IAT) sensor 192. One or more other sensors 193 may also be implemented. The other sensors 193 include an accelerator pedal position (APP) sensor, a brake pedal position (BPP) sensor, may include a clutch pedal position (CPP) sensor (e.g., in the case of a manual transmission), and may include one or more other types of sensors. An APP sensor measures a position of an accelerator pedal within a passenger cabin of the vehicle. A BPP sensor measures a position of a brake pedal within a passenger cabin of the vehicle. A CPP sensor measures a position of a clutch pedal within the passenger cabin of the vehicle. The other sensors 193 may also include one or more acceleration sensors that measure longitudinal (e.g., fore/aft) acceleration of the vehicle and latitudinal acceleration of the vehicle. An accelerometer is an example type of acceleration sensor, although other types of acceleration sensors may be used. The ECM 114 may use signals from the sensors to make control decisions for the engine 102.

The ECM 114 may communicate with a transmission control module 194, for example, to coordinate engine operation with gear shifts in a transmission 195. The ECM 114 may communicate with a hybrid control module 196, for example, to coordinate operation of the engine 102 and an electric motor 198. While the example of one electric motor is provided, multiple electric motors may be implemented. The electric motor 198 may be a permanent magnet electric motor or another suitable type of electric motor that outputs voltage based on back electromagnetic force (EMF) when free spinning, such as a direct current (DC) electric motor or a synchronous electric motor. In various implementations, various functions of the ECM 114, the transmission control module 194, and the hybrid control module 196 may be integrated into one or more modules.

Each system that varies an engine parameter may be referred to as an engine actuator. Each engine actuator has an associated actuator value. For example, the throttle actuator module 116 may be referred to as an engine actuator, and the throttle opening area may be referred to as the actuator value. In the example of FIG. 1, the throttle actuator module 116 achieves the throttle opening area by adjusting an angle of the blade of the throttle valve 112.

The spark actuator module 126 may also be referred to as an engine actuator, while the corresponding actuator value may be the amount of spark advance relative to cylinder TDC. Other engine actuators may include the cylinder actuator module 120, the fuel actuator module 124, the phaser actuator module 158, the wastegate actuator module 164, and the EGR actuator module 172. For these engine actuators, the actuator values may correspond to a cylinder activation/deactivation sequence, fueling rate, intake and exhaust cam phaser angles, target wastegate opening, and EGR valve opening, respectively.

The ECM 114 may control the actuator values in order to cause the engine 102 to output torque based on a torque request. The ECM 114 may determine the torque request, for example, based on one or more driver inputs, such as an APP, a BPP, a CPP, and/or one or more other suitable driver inputs. The ECM 114 may determine the torque request, for example, using one or more functions or lookup tables that relate the driver input(s) to torque requests.

Under some circumstances, the hybrid control module 196 controls the electric motor 198 to output torque, for example, to supplement engine torque output. The hybrid control module 196 may also control the electric motor 198 to output torque for vehicle propulsion at times when the engine 102 is shut down.

The hybrid control module 196 applies electrical power from a battery 208 to the electric motor 198 to cause the electric motor 198 to output positive torque. The battery 208 according to the principles of the present disclosure includes one or more adjustable battery systems as discussed below in more detail. The electric motor 198 may output torque, for example, to an input shaft of the transmission 195, to an output shaft of the transmission 195, or to another component. A clutch 200 may be implemented to couple the electric motor 198 to the transmission 195 and to decouple the electric motor 198 from the transmission 195. One or more gearing devices may be implemented between an output of the electric motor 198 and an input of the transmission 195 to provide one or more predetermined gear ratios between rotation of the electric motor 198 and rotation of the input of the transmission 195. In various implementations, the electric motor 198 may be omitted.

The ECM 114 starts the engine 102 via a starter motor 202. The ECM 114 or another suitable module of the vehicle engages the starter motor 202 with the engine 102 for an engine startup event. For example only, the ECM 114 may engage the starter motor 202 with the engine 102 when a key ON command is received. A driver may input a key ON command, for example, via actuating one or more ignition keys, buttons, and/or switches of the vehicle or of a key fob of the vehicle. The starter motor 202 may engage a flywheel coupled to the crankshaft or one or more other suitable components that drive rotation of the crankshaft.

The ECM 114 may also start the engine in response to an auto-start command during an auto-stop/start event or to an engine start command for a sailing event. Auto-stop/start events include shutting down the engine 102 while the vehicle is stopped, the driver has depressed the brake pedal, and the driver has not input a key OFF command. An auto-start command may be generated while the engine 102 is shut down for an auto-stop/start event, for example, when a driver releases the brake pedal and/or depresses the accelerator pedal.

Sail events may include the ECM 114 shutting down the engine 102 when the vehicle is moving (e.g., vehicle speed greater than a predetermined speed, such as 50 miles per hour), the driver is not actuating the accelerator pedal, and the driver has not input a key OFF command. An engine start command may be generated while the engine 102 is shut down for a sail event, for example, when a driver depresses the accelerator pedal. The driver may input a key OFF command, for example, via actuating the one or more ignition keys, buttons, and/or switches, as discussed above.

A starter motor actuator, such as a solenoid, may actuate the starter motor 202 into engagement with the engine 102. For example only, the starter motor actuator may engage a starter pinion with a flywheel coupled to the crankshaft. In various implementations, the starter pinion may be coupled to the starter motor 202 via a driveshaft and a one-way clutch. A starter actuator module 204 controls the starter motor actuator and the starter motor 202 based on signals from a starter control module, as discussed further below. In various implementations, the starter motor 202 may be maintained in engagement with the engine 102.

In response to a command to start the engine 102 (e.g., an auto-start command, an engine start command for an end of a sail event, or when a key ON command is received), the starter actuator module 204 supplies current to the starter motor 202 to start the engine 102. The starter actuator module 204 may also actuate the starter motor actuator to engage the starter motor 202 with the engine 102. The starter actuator module 204 may supply current to the starter motor 202 after engaging the starter motor 202 with the engine 102, for example, to allow for teeth meshing.

The application of current to the starter motor 202 drives rotation of the starter motor 202, and the starter motor 202 drives rotation of the crankshaft (e.g., via the flywheel). The period of the starter motor 202 driving the crankshaft to start the engine 102 may be referred to as engine cranking.

The starter motor 202 draws power from the battery 208 to start the engine 102. Once the engine 102 is running after the engine startup event, the starter motor 202 disengages or is disengaged from the engine 102, and current flow to the starter motor 202 may be discontinued. The engine 102 may be considered running, for example, when an engine speed exceeds a predetermined speed, such as a predetermined idle speed. For example only, the predetermined idle speed may be approximately 700 revolutions per minute (rpm) or another suitable speed. Engine cranking may be said to be completed when the engine 102 is running.

A generator 206 converts mechanical energy of the engine 102 into alternating current (AC) power. For example, the generator 206 may be coupled to the crankshaft (e.g., via gears or a belt) and convert mechanical energy of the engine 102 into AC power by applying a load to the crankshaft. The generator 206 rectifies the AC power into DC power and stores the DC power in the battery 208. Alternatively, a rectifier that is external to the generator 206 may be implemented to convert the AC power into DC power. The generator 206 may be, for example, an alternator. In various implementations, such as in the case of a belt alternator starter (BAS), the starter motor 202 and the generator 206 may be implemented together.

Figure 2:
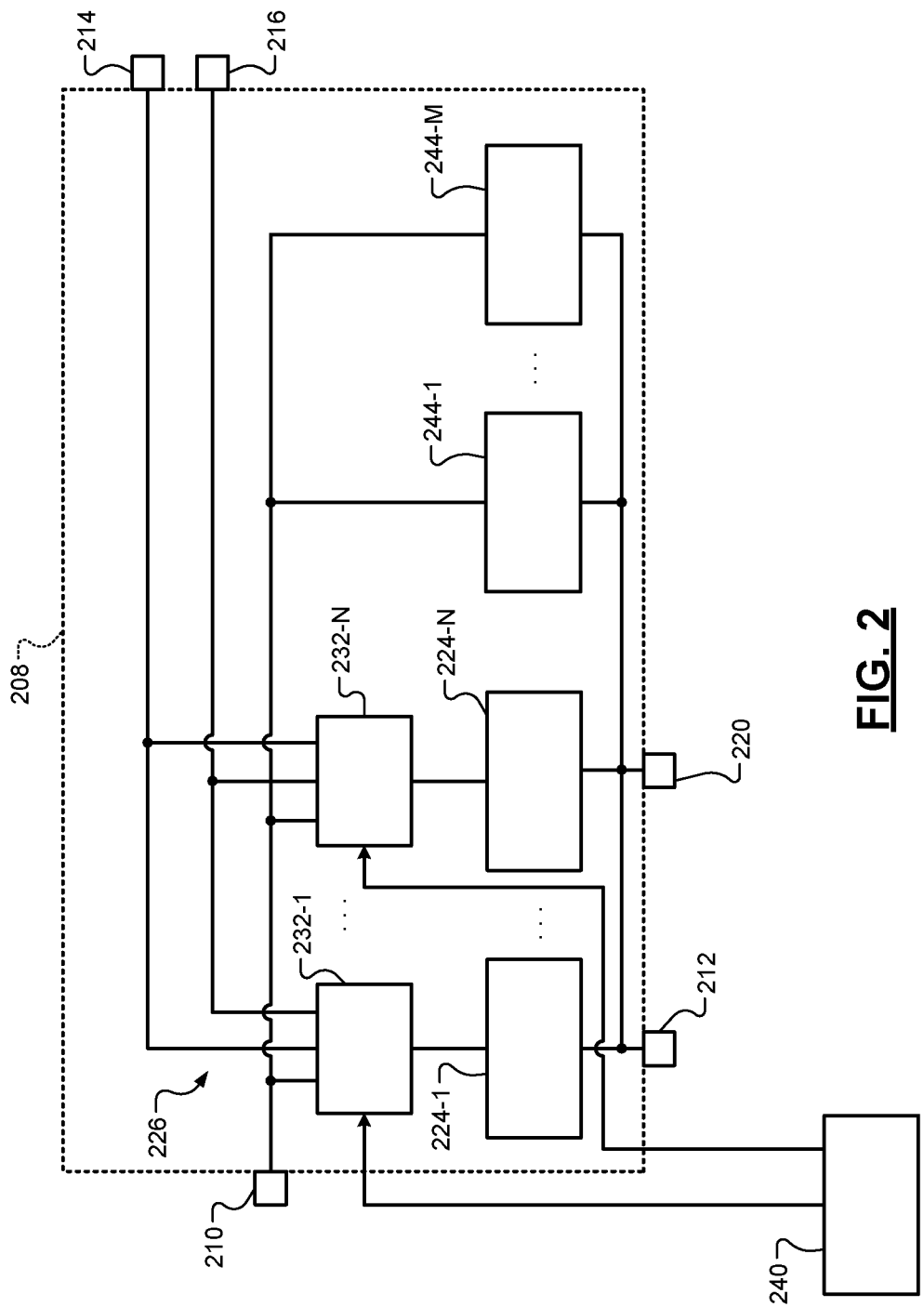
FIG. 2 is a functional block diagram an example battery system of a vehicle.

FIG. 2 is a functional block diagram of an example battery system of the vehicle. The battery system includes the battery 208 discussed above.

The battery 208 has two or more different sets of output terminals to provide two or more direct current (DC) operating voltages. Each set of output terminals includes a positive terminal and a negative terminal. Two or more sets of output terminals may share a negative terminal, or the negative terminals of two or more sets may be internally connected within the battery 208 or externally connected. For example only, the battery 208 may have a first positive (e.g., 48 Volt (V)) terminal 210, a first negative terminal 212, a second positive (e.g., a first 12 V) terminal 214, a third positive (e.g., a second 12 V) terminal 216, and a second negative terminal 220. While the example of the battery 208 having a 48 V operating voltage and two 12 V operating voltages is provided, the battery 208 may have one or more other operating voltages, such as only two 12 V operating voltages, only two 48 V operating voltages, two 48 V operating voltages and a 12 V operating voltage, or a combination of two or more other suitable operating voltages.

The battery 208 includes a plurality of individual batteries, such as a first battery 224-1, . . . , and an N-th battery 224-N ("batteries 224") of an adjustable battery system 226, where N is an integer greater than or equal to 2. In various implementations, N may be equal to 6, 8, 10, or 12. Each of the batteries 224 may include one or more battery cells, and each of the batteries 224 may be separately replaceable within the battery 208. For example only, each of the batteries 224 may be an individually housed 12 V DC battery. The ability to individually replace the batteries 224 may enable the battery 208 to include a shorter warranty period and have a lower warranty cost. The batteries 224 are also individually isolatable, for example, in the event of a fault in a battery module. In various implementations, the battery 208 may have the form factor of a standard automotive grade 12 V battery.

Each of the batteries 224 has its own separate capacity (e.g., in amp hours, Ah). The battery 208 includes a plurality of switches, such as first switches 232-1, . . . , N-th switches 232-N (collectively "switches 232"). The switches 232 enable the batteries 224 to be connected in series, parallel, or combinations of series and parallel to provide desired output voltages and capacities at the output terminals.

A switch control module 240 controls the switches 232 to provide desired output voltages and capacities at the output terminals. The switch control module 240 controls the switches 232 to vary the capacity provided at the output terminals based on a present operating mode of the vehicle, as discussed further below.

In some examples, the battery 208 may include one or more individual standard batteries, such as a first battery 244-1, . . . , and an M-th battery 244-M ("batteries 244"), where M is an integer greater than or equal to 2. As used herein, a "standard" battery corresponds to a non-adjustable battery having a fixed output voltage, such as an individual cell or module comprising a plurality of cells.

Figure 3A:
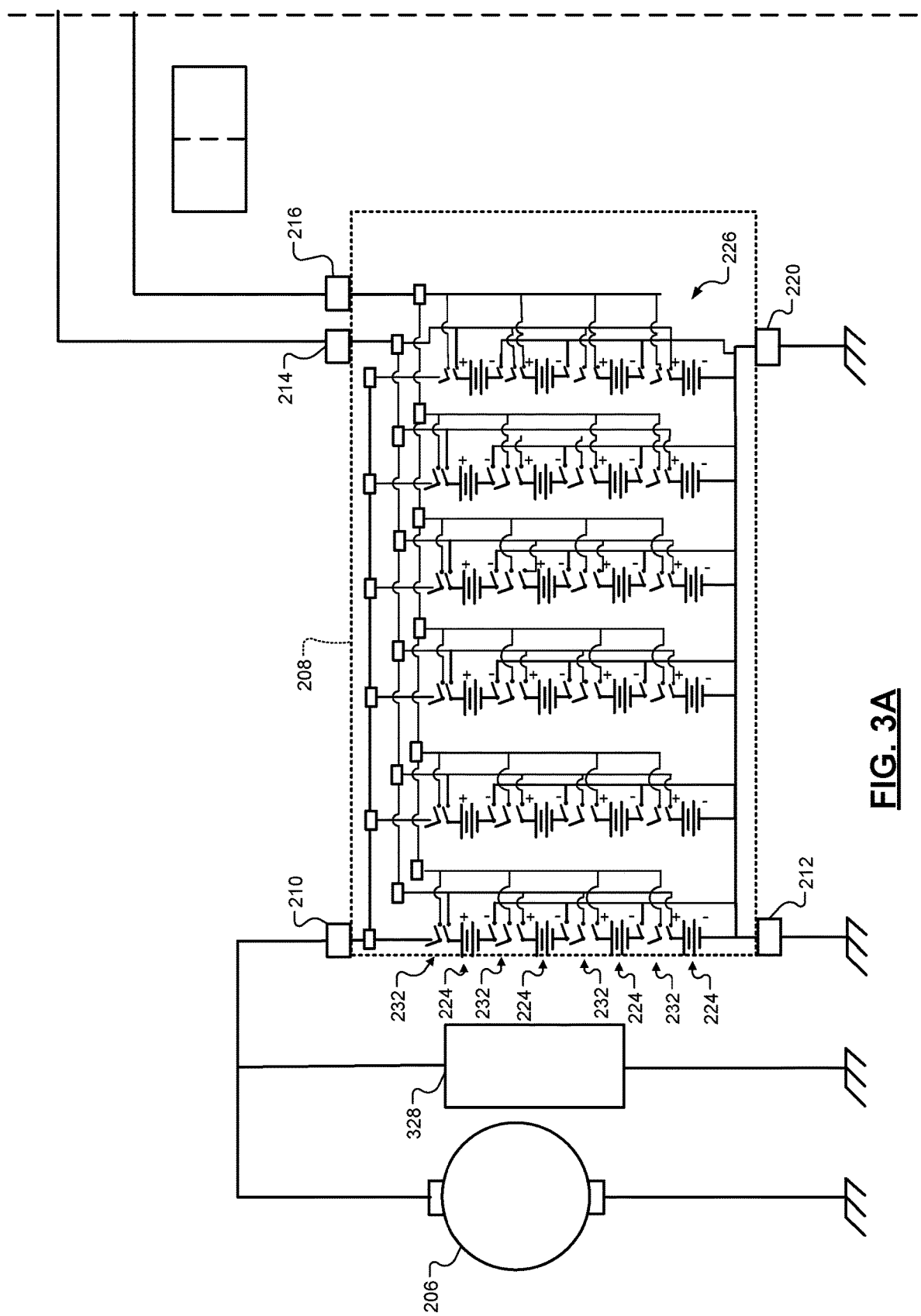
FIGS. 3A-3B are a schematic including an example implementation of a battery and battery system.
Figure 3B:
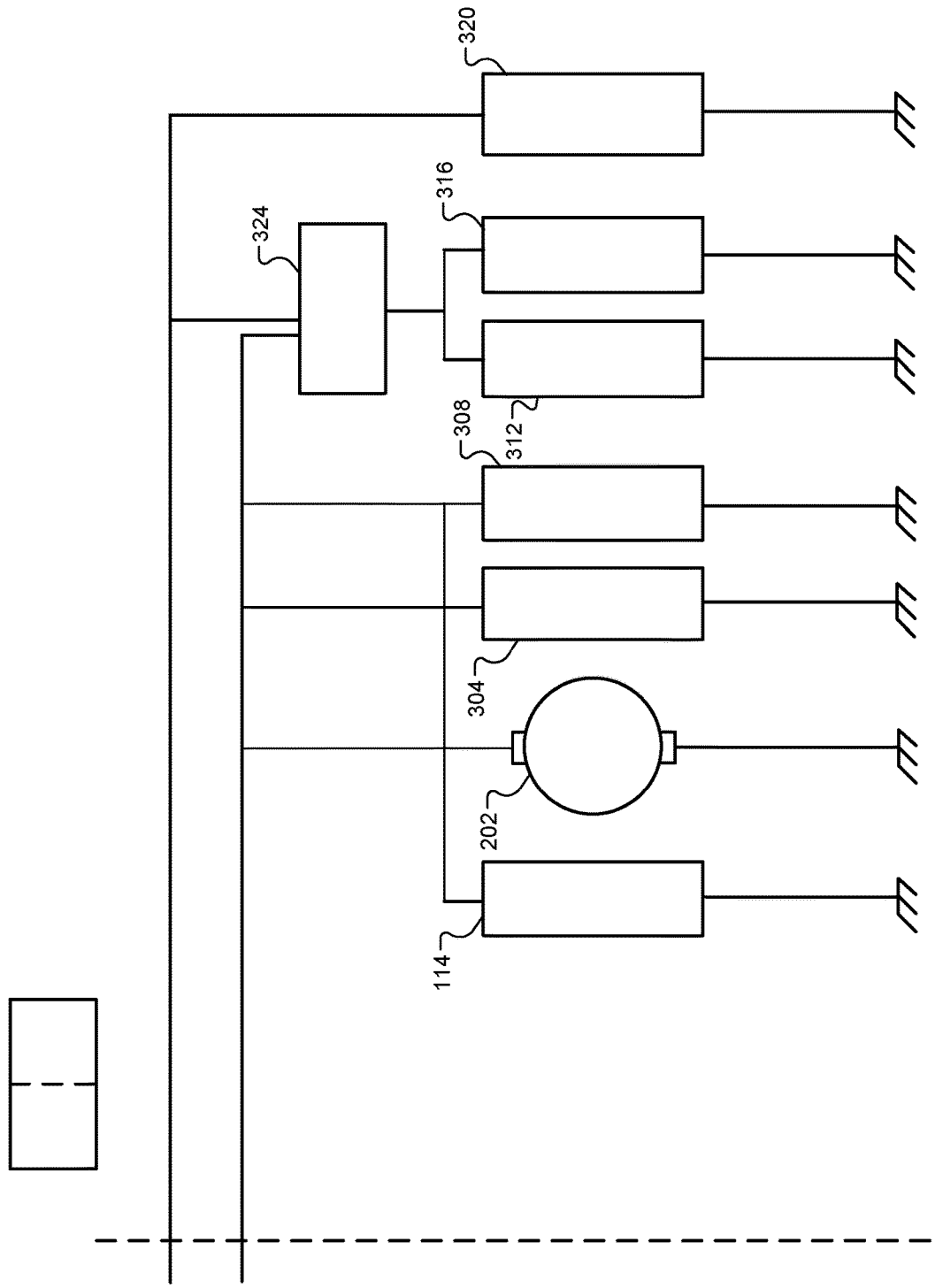

FIGS. 3A-3B are a schematic including an example implementation of the adjustable battery system 226 of the battery 208. In the example of FIG. 3A, sets of 4 of the batteries 224 (e.g., 12 V batteries) are connectable in series (via ones of the switches 232) to the first positive terminal 210 and the first negative terminal 212 to provide a first output voltage (e.g., 48 V). Individual ones of the batteries 224 can be connected (via ones of the switches 232) to the second positive terminal 214 or the third positive terminal 216 and the second negative terminal 220 to provide a second output voltage (e.g., 12 V) at the second and third positive terminals 214 and 216. How many of the batteries 224 are connected to the first positive terminal 210, the second positive terminal 214, and the third positive terminal 216 dictates the portions of the overall capacity of the battery 208 available at each of the positive terminals.

As shown in FIG. 3B, a first set of vehicle electrical components operates using one of the two or more operating voltages of the battery 208. For example, the first set of vehicle electrical components may be connected to the second and third positive terminals 214 and 216. Some of the first set of vehicle electrical components may be connected to the second positive terminal 214, and some of the first set of vehicle electrical components may be connected to the third positive terminal 216. The first set of vehicle electrical components may include, for example but not limited to, the ECM 114 and other control modules of the vehicle, the starter motor 202, and/or other electrical loads, such as first 12 V loads 304, second 12 V loads 308, other control modules 312, third 12 V loads 316, and fourth 12 V loads 320. In various implementations, a switching device 324 may be connected to both of the first and second positive terminals 214. The switching device 324 may connect the other control modules 312 and the third 12 V loads 316 to the second positive terminal 214 or the third positive terminal 216.

As shown in FIG. 3A, a second set of vehicle electrical components operates using another one of the two or more operating voltages of the battery 208. For example, the second set of vehicle electrical components may be connected to the first positive terminal 210. The second set of vehicle electrical components may include, for example but not limited to, the generator 206 and various electrical loads, such as 48 V loads 328. The generator 206 may be controlled to recharge the battery 208.

Each of the switches 232 may be an insulated gate bipolar transistor (IGBT), a field effect transistor (FET), such as a metal oxide semiconductor FET (MOSFET), or another suitable type of switch.

Figure 4:
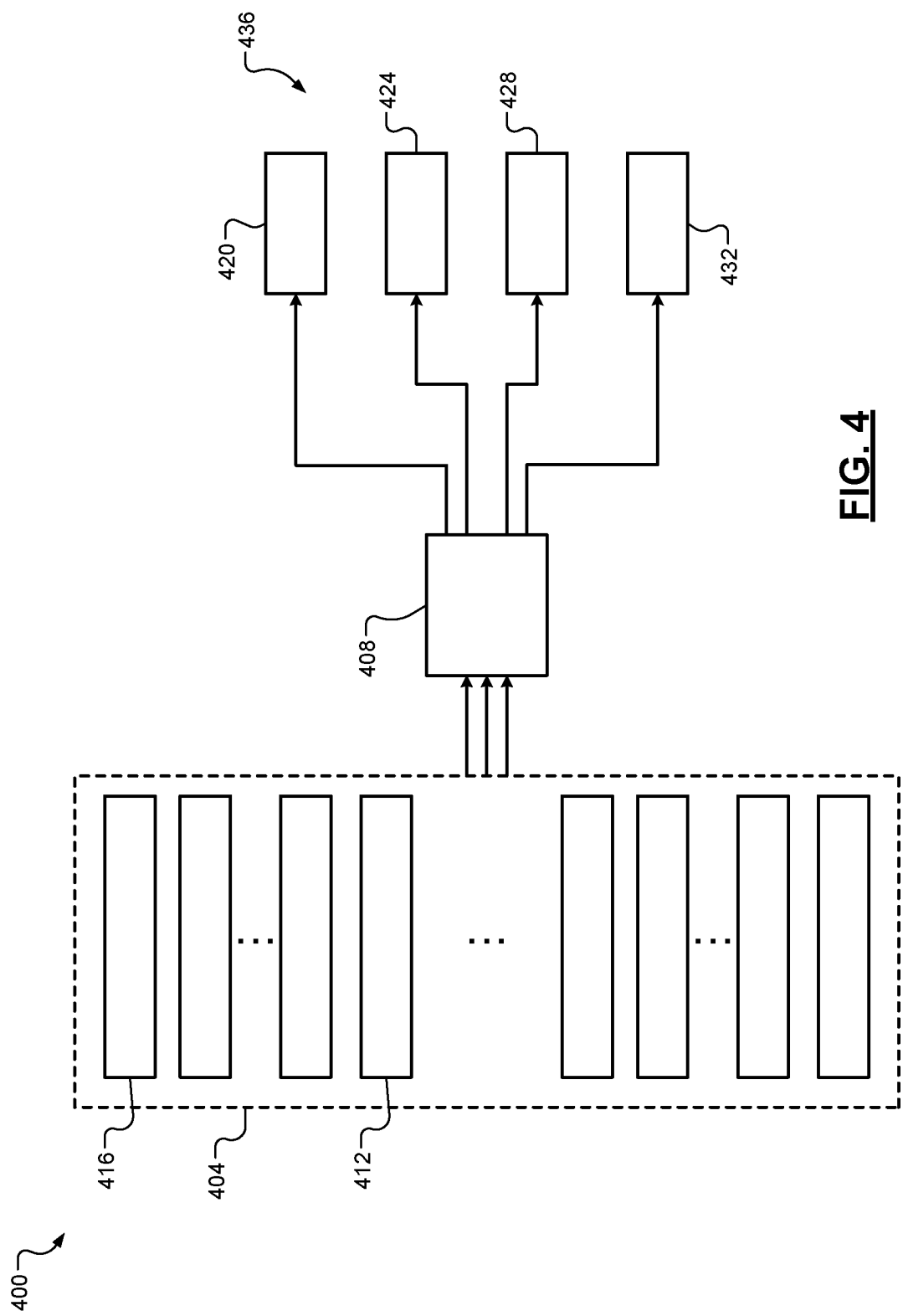
FIG. 4 is a functional block diagram of an example battery system.
Figure 5B:
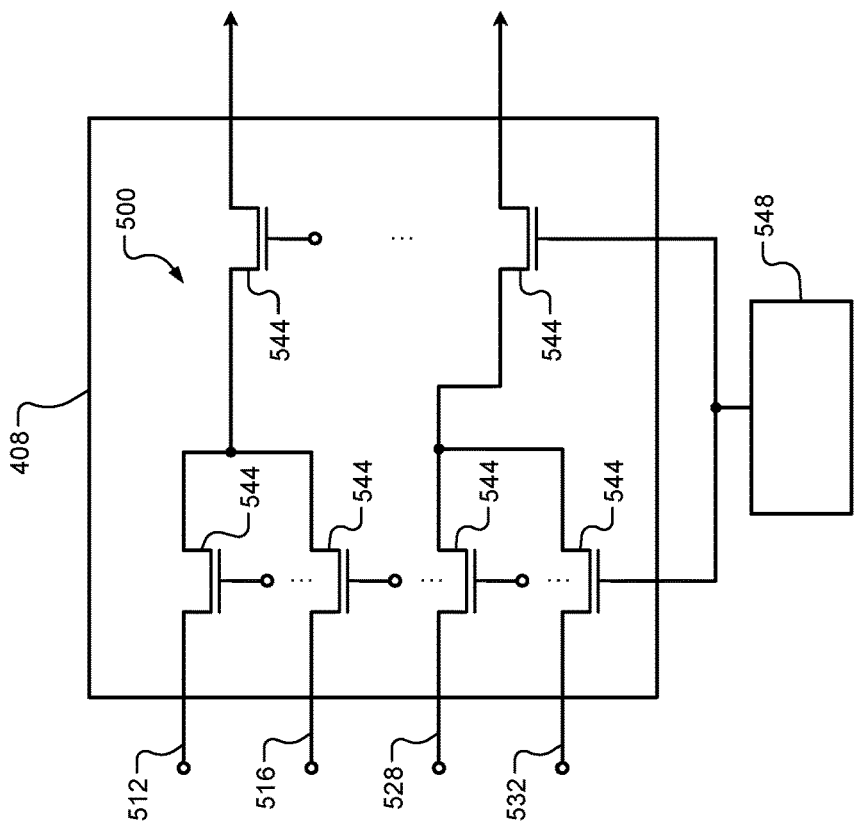
FIGS. 5A and 5B are a functional block diagram and a schematic of an example low voltage control module.
Figure 5A:
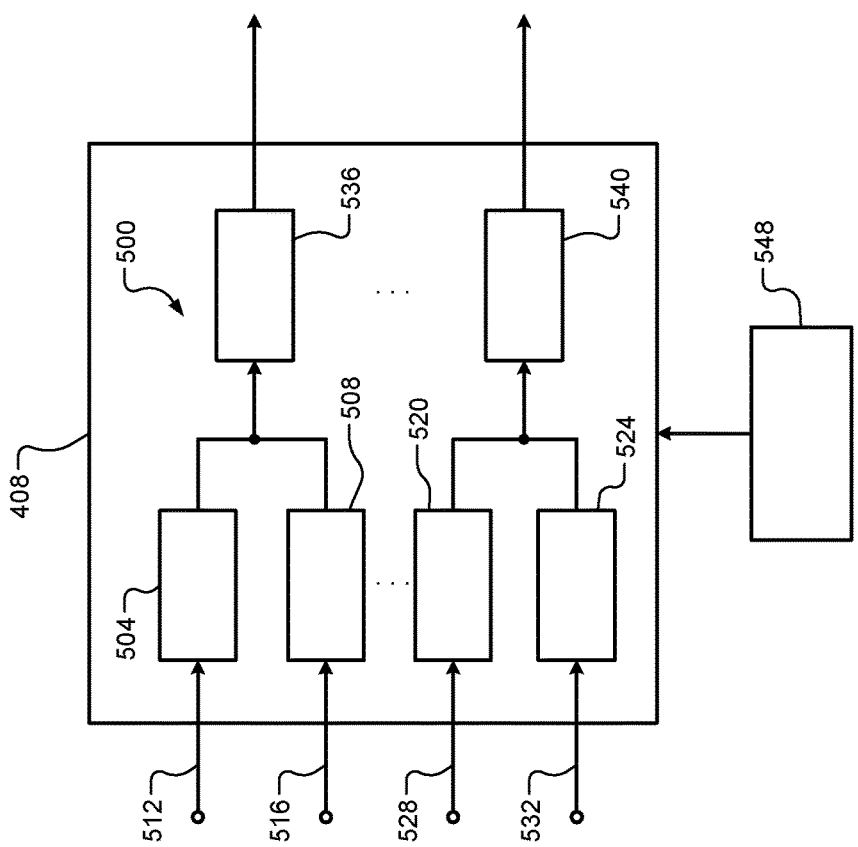

Referring now to FIGS. 4, 5A, and 5B, an example battery system 400 (e.g., a high voltage (HV) battery system) according to the present disclosure includes a battery 404 and a low voltage (LV) control module 408. The LV control module 408 may correspond to one or more controller components external to (as shown) and/or integrated within the battery 404, the adjustable battery systems 412, etc. For example, the battery 404 corresponds to the battery 208 described above in FIGS. 1-3 and may include a one or more adjustable battery systems 412 (e.g., corresponding to the adjustable battery system 226) described above in FIGS. 2-3. The battery 208 may further include one or more standard battery modules 416.

The LV control module 408 is configured to selectively provide power from the battery 404 to different sets of loads including, but not limited to, first 12 V loads 420, second 12 V loads 424, first 48 V loads 428, and second 48 V loads 432 (referred to collectively as LV loads 436). The various sets of LV loads 436 may correspond to respective LV rails, multiple buses per each LV rail, etc. that are isolated from HV loads. For example, some of the sets of LV loads 436 may correspond to Automotive Safety Integrity Level (ASIL) loads while others of the LV loads 436 are non-ASIL loads. As described below in more detail, the LV control module 408 is configured to provide LV power to the LV loads 436 from the adjustable battery systems 412 while the battery system 400 also provides HV power from the battery 404 to HV loads (e.g., a motor) and maintains isolation of the LV loads 436.

As shown in FIGS. 5A and 5B, the LV control module 408 includes a plurality of switching devices 500 arranged to receive a plurality of voltages selectively output from the adjustable battery systems 412 and output selected ones of the voltages to respective sets of loads. For example, switching devices 504 and 508 may receive first and second voltages 512 and 516 at a first value (e.g., 12 V), corresponding to respective 12 V outputs of one or more of the adjustable battery systems 412, to be output to a first set of loads (e.g., to 12 V loads via a first rail). Conversely, the switching devices 520 and 524 may receive third and fourth voltages 528 and 532 at a second value (e.g., 12 V, 24 V, 36 V, 48 V, etc.), corresponding to other outputs of one or more of the adjustable battery systems 412, to be output to a second set of loads via a second rail. For example only, the second set of loads may correspond to another set of 12 V loads (e.g., 12 V ASIL loads), a set of 48 V loads, etc.

The LV control module 408 may further include switching devices 536 and 540 arranged to function as disconnects to isolate the respective sets of loads from the voltages output from the adjustable battery systems 412. For example only, the switching devices 500 may correspond to FETs 544 (e.g., gate-controlled FETs) as shown in FIG. 5A. The FETs may be transitioned between ON and OFF states and/or operated in an ohmic region. Although shown as single FETs 544, each of the switching devices 500 may correspond to multiple FETs connect in series, parallel, etc.

The switching devices 500 are controlled to selectively provide a desired output voltage from the battery 404 to the loads. For example, a switch control module 548 controls the switching devices 500 to determine which input voltages output from the battery 404 are supplied to the respective sets of loads. The switch control module 548 may correspond to a same or different control module as the switch control module 240 described above. In other words, the LV control module 408 does not provide only a single path from the battery 404 to each set of loads for a desired output voltage and instead may select from a plurality of available output voltages provided by the adjustable battery systems 412 for a given set of loads (i.e., for a given rail). Accordingly, voltages provided to the various sets of rails can be regulated to maintain a desired output voltage (e.g., as states of charge (SOC) of battery modules within the adjustable battery systems 412 decrease, as loads vary, etc.).

Figure 6A:
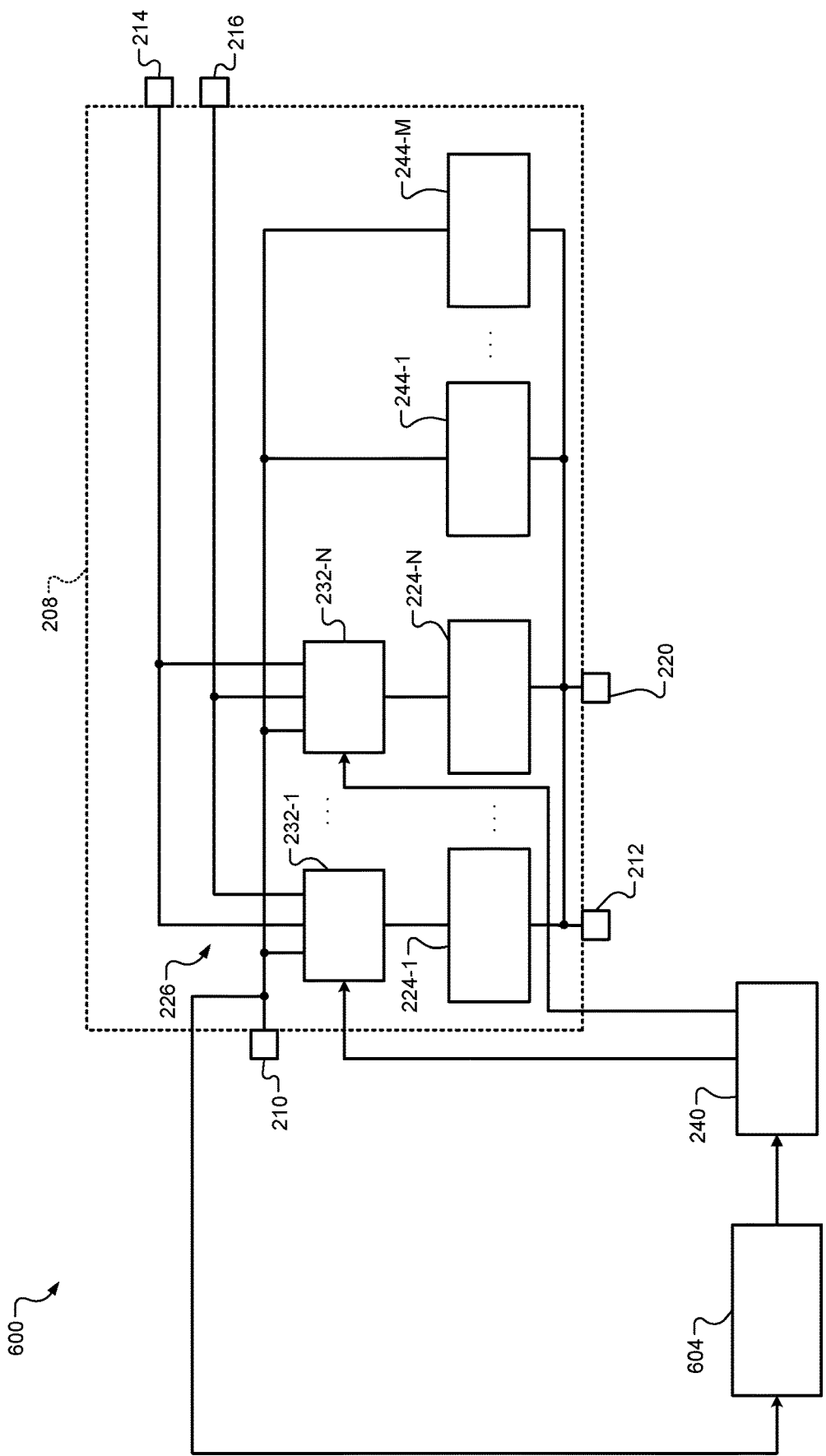
FIGS. 6A and 6B are functional block diagrams of an example battery system and voltage output control module.
Figure 6B:
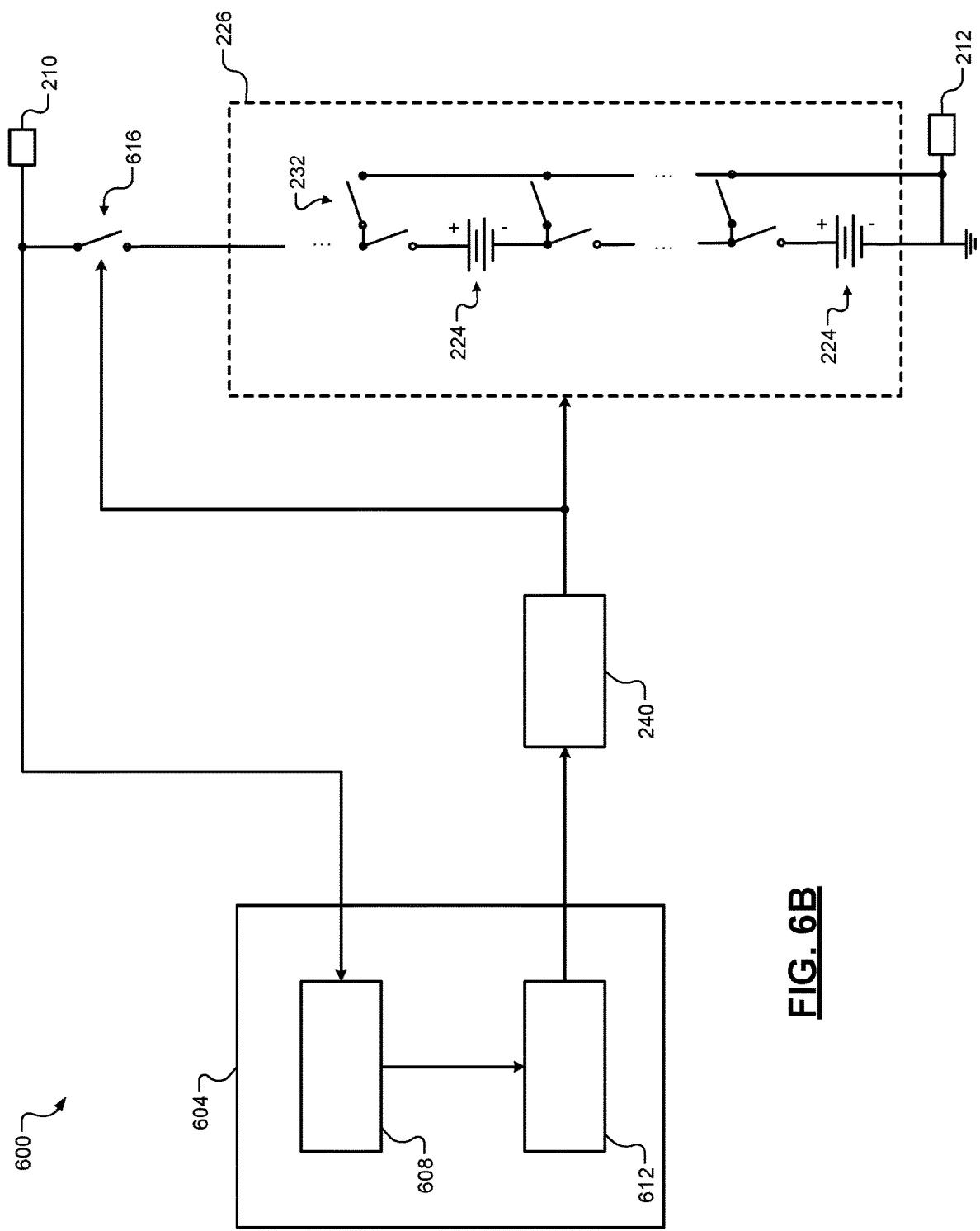

Referring now to FIGS. 6A and 6B, an example battery system 600 (e.g., an HV battery system) according to the present disclosure may include an HV output control module 604. For example, the HV output control module 604 is configured to maintain a desired output voltage of the battery 208 including one or more adjustable battery systems 226 as described in FIG. 2. The HV output control module 604 may correspond to one or more controller components external to (as shown) and/or integrated within the battery 208, the adjustable battery systems 226, the switch control module 240, etc.

The HV output control module 604 may be configured to detect an output voltage of the battery 208 (e.g., a voltage output to a motor). For example, the HV output control module 604 includes an output voltage detection module 608 (e.g., a voltage sensing circuit) in communication with one or more output terminals (e.g., 210, 214, or 216) of the battery 208 to receive and detect the output voltage. An output voltage control module 612 receives an indication of the detected output voltage and selectively adjusts the adjustable battery system 226 based on the detected output voltage. For example, the output voltage control module 612 may operate one or more switches of the adjustable battery system 226 and/or, as shown in FIGS. 6A and 6B, control the switch control module 240 to operate one or more switches of the adjustable battery system 226 as described below in more detail.

For example, as shown in FIG. 6B, in addition to the switches 232, the switch control module 240 may selectively control one or more switches 616 that selectively connect individual ones of the batteries 224 and/or sets of the batteries 224 (e.g., sets of the batteries 224 corresponding to a specific rail voltage) to respective output terminals. Although only one switch 616 is shown for simplicity, the battery system 600 may include a plurality of the switches 616. The switch 616 may correspond to a FET (e.g., a gate-controlled FET) transitioned between ON and OFF states and/or operated in an ohmic region. For example, the switch control module 240 closes the switch 616 to selectively add voltages (e.g., 12 V, 24 V, 36 V, 48 V, etc.) of respective batteries 224 or sets of the batteries 224 to the output voltage. Conversely, the switch control module 240 opens the switch 616 to selectively subtract voltages (e.g., 12 V, 24 V, 36 V, 48 V, etc.) of respective batteries 224 or sets of the batteries 224 from the output voltage.

In this manner, the switch control module 240 is configured to maintain a flat output voltage as the output voltage decreases (e.g., as SOCs and voltages of individual batteries 224 drop over time). For example, the switch control module 240 may selectively add voltages of specific batteries 224 or sets of the batteries 224 (e.g., to add 12 V, 24 V, etc.) to the output voltage in response to a decrease in the output voltage as detected by the output voltage detection module 608. In some examples, the switch control module 240 may subtract voltages (e.g., by opening respective switches 216) to enable an increase of a pulse width modulation (PWM) percentage.

Figure 7A:
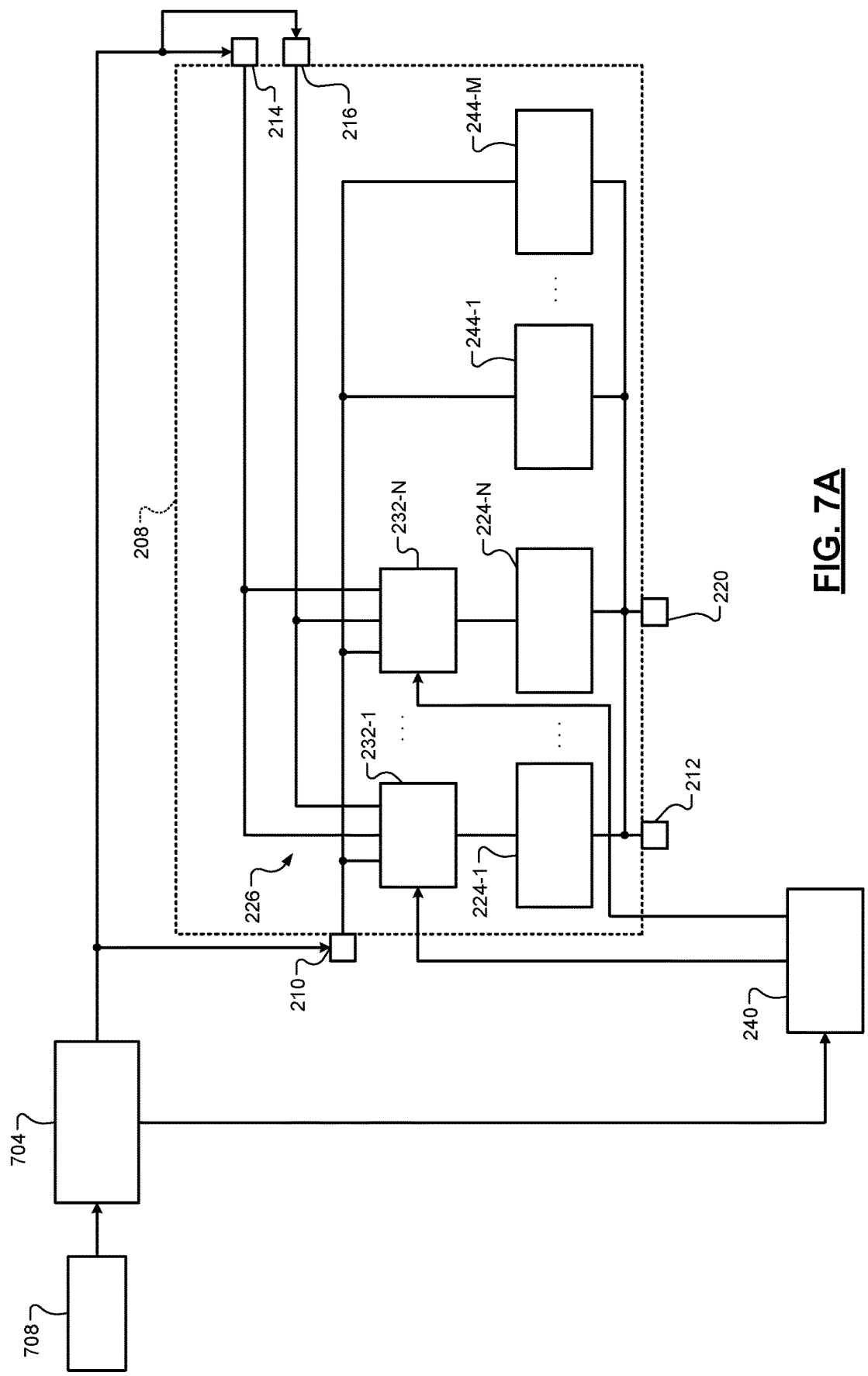
FIGS. 7A and 7B are functional block diagrams of an example battery system and charging module.
Figure 7B:
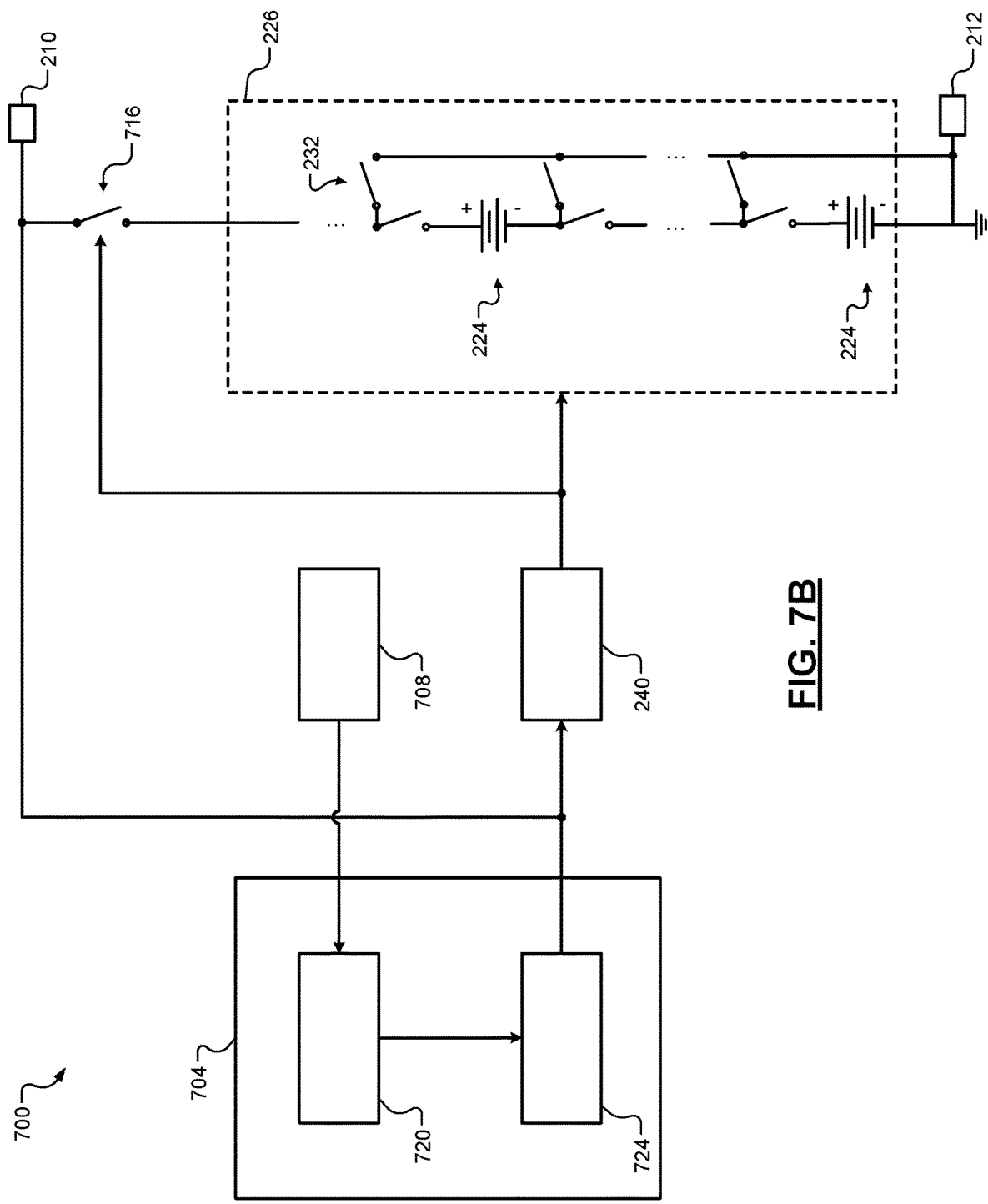

Referring now to FIGS. 7A and 7B, an example battery system 700 according to the present disclosure may include a charging module 704. The charging module 704 is configured to receive a charging voltage from an external charger 708 and selectively provide the charging voltage to individual batteries 224, 244, etc. of the battery 208. The charging module 704 may correspond to one or more controller components external to (as shown) and/or integrated within the battery 208, the adjustable battery systems 226, the switch control module 240, the LV control module 408, etc.

The charging module 704 may be configured to detect the charging voltage (e.g., 12 V, 24 V, 36 V, 48 V, etc.) as provided by the external charger 708 and adjust a configuration of the adjustable battery systems 226 to receive the charging voltage. Accordingly, the battery system 700 is configured to receive a range of charging voltages and selectively apply the charging voltage to the batteries 224. In some examples, the charging module 704 (and/or a separate charging module) may be further configured to receive a charging voltage and selectively direct the charging voltage to different batteries 224 or sets of batteries (e.g., to selected adjustable battery systems 226, batteries 244, etc.) of the battery system 400. For example, in implementations including both the adjustable battery systems 226 and standard batteries or battery modules 244, the charging module 704 may adjust relative rates of charging of the adjustable battery systems 226 and the batteries 244 (e.g., by operating corresponding FETs to adjust current provided to selected batteries). In other words, respective charging rates of the adjustably battery systems 226 can be increased and decreased relative to charging rates of the batteries 244.

In one example as shown in FIG. 7B, in addition to the switches 232, the switch control module 240 may selectively control one or more switches 716 that selectively connect individual ones of the batteries 224 and/or sets of the batteries 224 (e.g., sets of the batteries 224 corresponding to a specific rail voltage) to an output terminal receiving the charging voltage. Although only one switch 716 is shown for simplicity, the battery system 700 may include a plurality of the switches 716 for respective batteries 244, adjustable battery systems 226, etc. The switch 716 may correspond to a FET (e.g., a gate-controlled FET) transitioned between ON and OFF states and/or operated in an ohmic region. For example, the switch control module 240 closes the switch 716 to selectively connect respective batteries 244, batteries 224, or sets of the batteries 224 in an adjustable battery system 226 to the charging voltage to provide selective charging.

In this manner, the battery system 700 is configured to achieve faster or slower charging of individual batteries as desired (i.e., preferential charging). For example, the battery system 700 may configure charging to charge the batteries 224 of the adjustable battery systems 226 at a greater or lower rate than the standard batteries 244, to maintain balance of the SOCs of all or selected batteries, and or to charge the batteries 224 and 244 in accordance with a predetermined charging sequence. Further, based on the sensed charging voltage and various system parameters (e.g., ambient and component temperatures, SOCs of respective batteries, loads, etc.), the battery system is configured to optimize charging for a desired reliability, charging speed, etc.

For example, the charging module 704 may include a charging voltage sensing module 720 in communication with the external charger 708 to receive and detect the output voltage. A charging voltage control module 724 receives the charging voltage and an indication of the sensed charging voltage and selectively adjusts the adjustable battery system 226 based on the detected output voltage. For example, the charging voltage control module 724 may operate one or more switches of the adjustable battery system 226 and/or, as shown in FIGS. 7A and 7B, control the switch control module 240 to operate one or more switches of the adjustable battery system 226.

In one example, the charging voltage control module 724 (e.g., via the switch control module 240) selects which of the batteries 224 and 244 receive the charging voltage. For example, if the charging voltage as received from the external charger 708 is 12 V, the switches 232 can be opened or closed to apply the charging voltage to selected individual batteries 224 in a given adjustable battery system 226. For example, the charging voltage can be separately (e.g., sequentially) applied to individual 12 V batteries 224. Conversely, if the charging voltage is detected to be 24 V, the charging voltage can be applied, sequentially, to different pairs of 12 V batteries 224. The switches 232 can be operated in a similar manner to apply charging voltages of 36 V (e.g., to apply the 36 V charging voltage to sets of three of the batteries 224) and 48 V (e.g., to apply the 48 V charging voltage to sets of four of the batteries 224) to suitable sets of the batteries 224.

For example only, applying a 12 V charging voltage sequentially to individual ones of the batteries 224 may correspond to a slowest charging mode (e.g., a slowest charging rate of the adjustable battery system relative to the charging of one of the standard batteries 244. In other words, since each of the batteries 224 is charged individually, an amount of time required to charge all of the batteries 224 is increased. Applying a 24 V charging voltage sequentially to different pairs of the batteries 244 may correspond to a next slowest charging mode. Applying a 48 V charging voltage sequentially to sets of four of the batteries 224 corresponds to a fastest charging mode and applying a 36 V charging voltage to sets of three of the batteries corresponds to a next fastest charging mode.

In each of the charging modes (i.e., regardless of how many of the batteries 244 are charged at a time), a same power (i.e., voltage and current) is applied to each of the individual batteries 224, but the overall percentage of charging power applied to the batteries 224 relative to the standard batteries 244 varies. In other words, while charging an individual one of the batteries 224 at 12 V, the percentage of power applied to the battery 224 relative to the overall power applied to charge the batteries 224 of the adjustable battery system 226 and the standard batteries 244 is comparatively low. Conversely, while charging a set of four of the batteries 224 at 48 V, while the power to each of the individual batteries 224 is not increased, the percentage of power applied to the selected set of four of the batteries 224 relative to the overall power applied to charge the batteries 224 of the adjustable battery system 226 and the standard batteries 244 is comparatively high.

In the manner described above, one or sets of two, three, four, or more of the individual batteries 224 can be charged at a time to vary the charging rate and the percentage of charging power used to charge the adjustable battery systems 226 relative to the standard batteries 244 without increasing the amount of power provided to individual ones of the batteries 224.

In other examples, selective charging may be provided by adjusting respective impedances of individual batteries 224 or sets of batteries 224 in an adjustable battery system 226 (e.g., using one or more gate-controlled FETs), increasing and/or decreasing resistance of individual batteries 224 or sets of batteries 224 (e.g., using FETs or adjustable resistors to add or remove resistance), etc.

Figure 8:
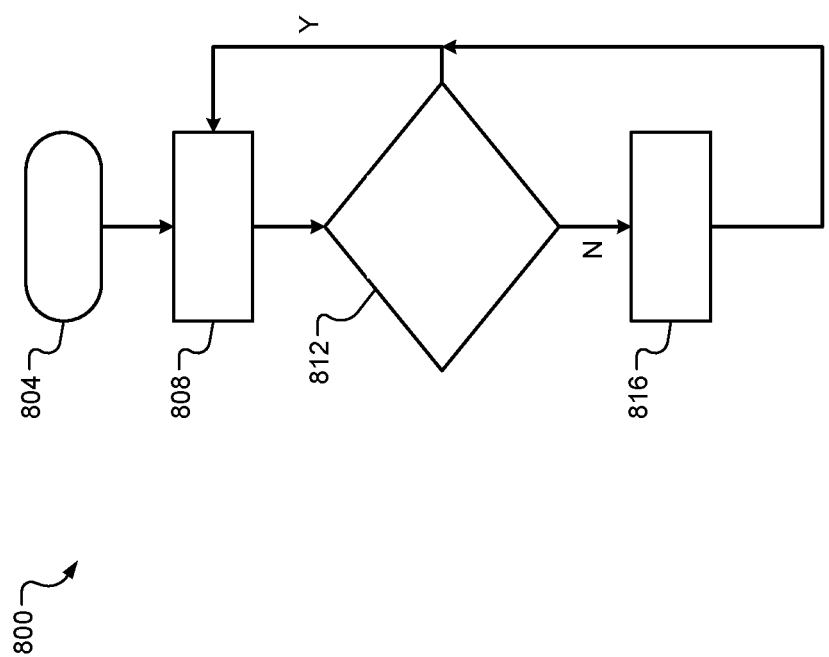
FIG. 8 illustrates steps of an example method for operating an adjustable battery system to maintain a desired output voltage.

Referring now to FIG. 8, an example method 800 for operating an adjustable battery system to maintain a desired output voltage according to the present disclosure begins at 804. At 808, the method 800 detects an output voltage. At 812, the method 800 determines whether the detected output voltage corresponds to (e.g., is within a threshold, such as 8V, of) a desired output voltage. If true, the method 800 continues to 808. If false, the method 800 continues to 816. At 816, the method 800 adjusts the output voltage. For example, the method 800 selectively connects batteries 224 of the adjustable battery system 226 to a corresponding output terminal to increase the output voltage (e.g., in increments of 12V) and/or disconnects batteries from the output terminal to decrease the output voltage. The method 800 then continues to 808.

Figure 9:
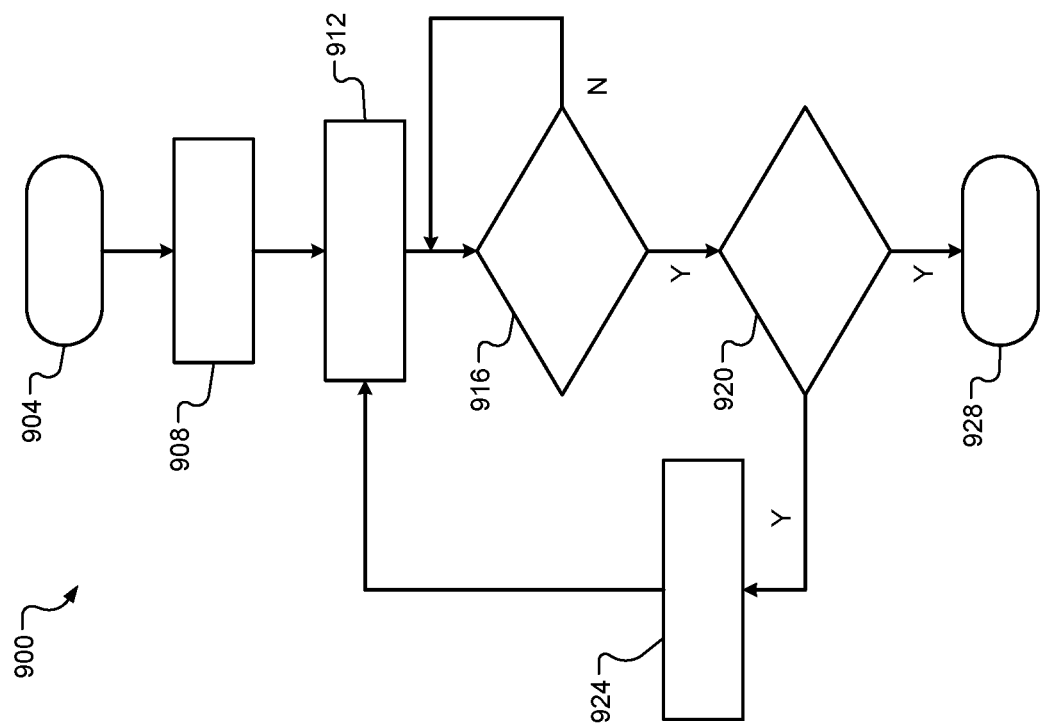
FIG. 9 illustrates steps of an example method for charging an adjustable battery system.

Referring now to FIG. 9, an example method 800 for charging an adjustable battery system according to the present disclosure begins at 904. At 908, the method 900 senses a charging voltage supplied to an adjustable battery system. At 912, the method 900 connects one or more batteries of the adjustable battery system to an output terminal that is receiving the charging voltage based on the detected charging voltage. For example, the method 900 connects a number of batteries (e.g., one or more) corresponding to the detected charging voltage. At 916, the method 900 determines whether charging of the connected batteries is complete (e.g., whether the SOCs of the connected batteries are above a threshold). If true, the method 900 continues to 920. If false, the method 900 continues to 916.

At 920, the method 900 determines whether additional batteries require charging. If true, the method 900 continues to 924. If false, the method 900 ends at 928. At 924, the method 900 connects another battery or set of batteries to the output terminal and continues to 916.

The foregoing description is merely illustrative in nature and is in no way intended to limit the disclosure, its application, or uses. The broad teachings of the disclosure can be implemented in a variety of forms. Therefore, while this disclosure includes particular examples, the true scope of the disclosure should not be so limited since other modifications will become apparent upon a study of the drawings, the specification, and the following claims. While vehicle examples are provided, the principles of the present disclosure are also applicable to non-vehicle implementations. It should be understood that one or more steps within a method may be executed in different order (or concurrently) without altering the principles of the present disclosure. Further, although each of the embodiments is described above as having certain features, any one or more of those features described with respect to any embodiment of the disclosure can be implemented in and/or combined with features of any of the other embodiments, even if that combination is not explicitly described. In other words, the described embodiments are not mutually exclusive, and permutations of one or more embodiments with one another remain within the scope of this disclosure.

Spatial and functional relationships between elements (for example, between modules, circuit elements, semiconductor layers, etc.) are described using various terms, including "connected," "engaged," "coupled," "adjacent," "next to," "on top of," "above," "below," and "disposed." Unless explicitly described as being "direct," when a relationship between first and second elements is described in the above disclosure, that relationship can be a direct relationship where no other intervening elements are present between the first and second elements, but can also be an indirect relationship where one or more intervening elements are present (either spatially or functionally) between the first and second elements. As used herein, the phrase at least one of A, B, and C should be construed to mean a logical (A OR B OR C), using a non-exclusive logical OR, and should not be construed to mean "at least one of A, at least one of B, and at least one of C."

In the figures, the direction of an arrow, as indicated by the arrowhead, generally demonstrates the flow of information (such as data or instructions) that is of interest to the illustration. For example, when element A and element B exchange a variety of information but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, including the definitions below, the term "module" or the term "controller" may be replaced with the term "circuit." The term "module" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The module may include one or more interface circuits. In some examples, the interface circuits may include wired or wireless interfaces that are connected to a local area network (LAN), the Internet, a wide area network (WAN), or combinations thereof. The functionality of any given module of the present disclosure may be distributed among multiple modules that are connected via interface circuits. For example, multiple modules may allow load balancing. In a further example, a server (also known as remote, or cloud) module may accomplish some functionality on behalf of a client module.

The term code, as used above, may include software, firmware, and/or microcode, and may refer to programs, routines, functions, classes, data structures, and/or objects.

The term shared processor circuit encompasses a single processor circuit that executes some or all code from multiple modules. The term group processor circuit encompasses a processor circuit that, in combination with additional processor circuits, executes some or all code from one or more modules. References to multiple processor circuits encompass multiple processor circuits on discrete dies, multiple processor circuits on a single die, multiple cores of a single processor circuit, multiple threads of a single processor circuit, or a combination of the above. The term shared memory circuit encompasses a single memory circuit that stores some or all code from multiple modules. The term group memory circuit encompasses a memory circuit that, in combination with additional memories, stores some or all code from one or more modules.

The term memory circuit is a subset of the term computer-readable medium. The term computer-readable medium, as used herein, does not encompass transitory electrical or electromagnetic signals propagating through a medium (such as on a carrier wave); the term computer-readable medium may therefore be considered tangible and non-transitory. Non-limiting examples of a non-transitory, tangible computer-readable medium are nonvolatile memory circuits (such as a flash memory circuit, an erasable programmable read-only memory circuit, or a mask read-only memory circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general purpose computer to execute one or more particular functions embodied in computer programs. The functional blocks, flowchart components, and other elements described above serve as software specifications, which can be translated into the computer programs by the routine work of a skilled technician or programmer.

The computer programs include processor-executable instructions that are stored on at least one non-transitory, tangible computer-readable medium. The computer programs may also include or rely on stored data. The computer programs may encompass a basic input/output system (BIOS) that interacts with hardware of the special purpose computer, device drivers that interact with particular devices of the special purpose computer, one or more operating systems, user applications, background services, background applications, etc.

The computer programs may include: (i) descriptive text to be parsed, such as HTML (hypertext markup language), XML (extensible markup language), or JSON (JavaScript Object Notation) (ii) assembly code, (iii) object code generated from source code by a compiler, (iv) source code for execution by an interpreter, (v) source code for compilation and execution by a just-in-time compiler, etc. As examples only, source code may be written using syntax from languages including C, C++, C #, Objective-C, Swift, Haskell, Go, SQL, R, Lisp, Java®, Fortran, Perl, Pascal, Curl, OCaml, Javascript®, HTML5 (Hypertext Markup Language 5th revision), Ada, ASP (Active Server Pages), PHP (PHP: Hypertext Preprocessor), Scala, Eiffel, Smalltalk, Erlang, Ruby, Flash®, Visual Basic®, Lua, MATLAB, SIMULINK, and Python®.

What is claimed is:

1. A battery control system, comprising:
    first and second batteries each comprising:
        first and second terminals configured to output a first voltage;
        third and fourth terminals configured to output a second voltage different from the first voltage;
        a plurality of individually housed batteries; and
        a plurality of switches configured to connect any one of the individually housed batteries to and from any one of the first, second, third, and fourth terminals;
    a plurality of switching devices arranged between (i) the first, second, third, and fourth terminals and (ii) a first set of loads and a second set of loads; and
    a control module configured to control the plurality of switches and the plurality of switching devices to (i) selectively provide the first voltage from the connected ones of the individually housed batteries of either one of the first battery and the second battery to the first set of loads and (ii) selectively provide the second voltage from the connected ones of the individually housed batteries of either one of the first battery and the second battery to the second set of loads,
    wherein the plurality of switching devices includes a first switching device configured to receive and selectively output the first voltage from the first battery and a second switching device configured to receive and selectively output the first voltage from the second battery,
    wherein the plurality of switching devices includes a third switching device configured to receive and selectively output the second voltage from the first battery and a fourth switching device configured to receive and selectively output the second voltage from the second battery, and
    wherein the plurality of switching devices includes a fifth switching device configured to (i) receive the first voltage from either one of the first switching device and the second switching device and (ii) supply the first voltage to the first set of loads.

2. The battery control system of claim 1, wherein the first voltage is one of 12 volts, 24 volts, 36 volts, and 48 volts.

3. The battery control system of claim 1, wherein the plurality of switching devices includes a sixth switching device configured to (i) receive the second voltage from either one of the third switching device and the fourth switching device and (ii) supply the second voltage to the second set of loads.

4. A battery control system, comprising:
    a battery comprising:
        first and second terminals configured to output a first voltage;
        third and fourth terminals configured to output a second voltage;
        a plurality of individually housed batteries; and
        a plurality of switches configured to connect ones of the individually housed batteries to and from ones of the first, second, third, and fourth terminals; and
    an output control module configured to (i) detect either one of the first voltage and the second voltage and (ii) connect selected ones of the individually housed batteries to a corresponding one of the first and second terminals and the third and fourth terminals,
    wherein, to adjust the detected one of the first voltage and the second voltage, the output control module is configured to selectively disconnect one or more of the individually housed batteries to decrease the detected one of the first voltage and the second voltage based on a difference between a desired output voltage and the detected one of the first voltage and the second voltage.

5. The battery control system of claim 4, wherein, to adjust the detected one of the first voltage and the second voltage, the output control module is further configured to selectively connect one or more of the individually housed batteries to increase the detected one of the first voltage and the second voltage based on a difference between a desired output voltage and the detected one of the first voltage and the second voltage.

6. The battery control system of claim 4, wherein the output control module includes an output voltage detection module configured to detect the first voltage and the second voltage.

7. The battery control system of claim 4, wherein, to adjust the detected one of the first voltage and the second voltage, the output control module is further configured to sequentially connect two more of the individually housed batteries to incrementally increase the detected one of the first voltage and the second voltage based on a difference between a desired output voltage and the detected one of the first voltage and the second voltage.

8. A battery control system, comprising:
a battery comprising:
first and second terminals configured to output a first voltage;
third and fourth terminals configured to output a second voltage;
a plurality of individually housed batteries; and
a plurality of switches configured to connect ones of the individually housed batteries to and from ones of the first, second, third, and fourth terminals;
a charging module configured to (i) detect a charging voltage provided from an external charger to the first and second terminals or the third and fourth terminals and (ii) connect selected ones of the individually housed batteries to a corresponding one of the first and second terminals and the third and fourth terminals in accordance with the detected charging voltage to charge the selected ones of the individually housed batteries.

9. The battery control system of claim 8, wherein the charging module is configured to (i) connect one of the individually housed batteries to the corresponding one of the first and second terminals and the third and fourth terminals in response to detecting that the charging voltage corresponds to the first voltage and (ii) connect two or more of the individually housed batteries to the corresponding one of the first and second terminals and the third and fourth terminals in response to detecting that the charging voltage corresponds to the second voltage.

10. The battery control system of claim 8, wherein the charging module is configured to sequentially connect ones of the individually housed batteries to the corresponding one of the first and second terminals and the third and fourth terminals.

11. The battery control system of claim 10, wherein the charging module is configured to disconnect the connected one of the individually housed batteries from the corresponding one of the first and second terminals and the third and fourth terminals in response to a determination that charging of the connected one of the individually housed batteries is complete.

12. The battery control system of claim 8, wherein the charging module is configured to sequentially connect sets of two or more of the individually housed batteries to the corresponding one of the first and second terminals and the third and fourth terminals.

13. The battery control system of claim 8, wherein the charging module is configured to (i) connect one of the individually housed batteries to the corresponding one of the first and second terminals and the third and fourth terminals when the charging voltage corresponds to 12 volts and (i) connect two or more of the individually housed batteries to the corresponding one of the first and second terminals and the third and fourth terminals when the charging voltage corresponds to more than 12 volts.

14. The battery control system of claim 8, further comprising a second battery, wherein the charging module is configured to selectively supply the charging voltage from the external charger to one of the battery and the second battery.

15. The battery control system of claim 14, wherein the charging module is configured to selectively supply the charging voltage from the external charger to the one of the battery and the second battery based on a predetermined charging sequence.

* * * * *